United States Patent Office 3,406,431
Patented Oct. 22, 1968

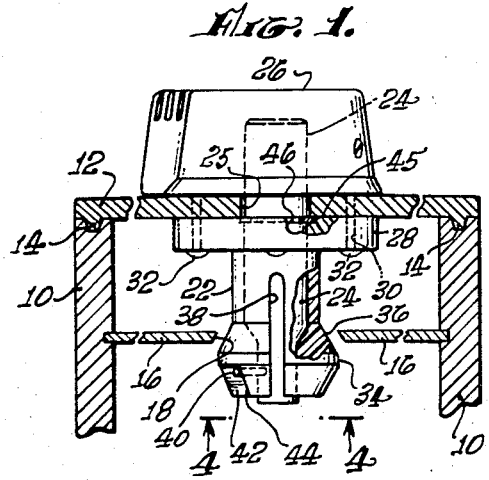
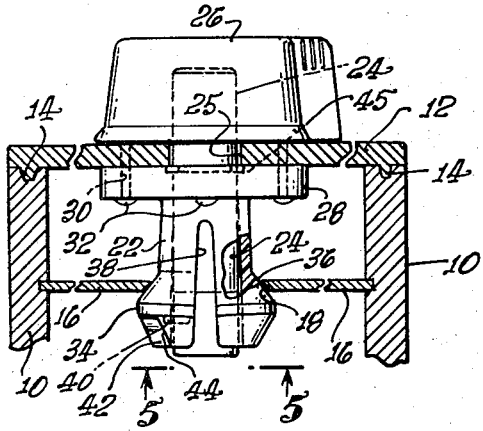
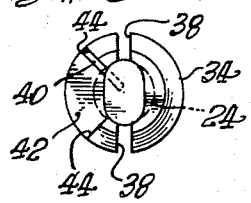
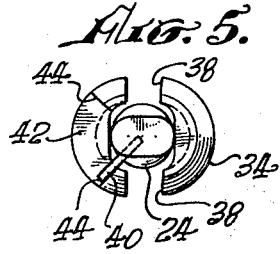
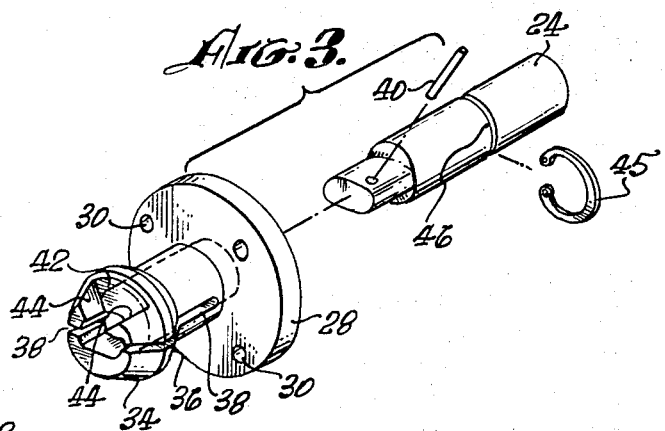
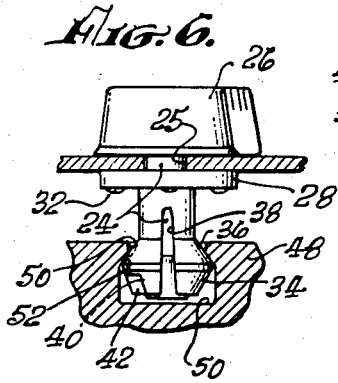
INVENTORS.
LEE B. ARMSTRONG,
MARVIN A. REID,
By Jesse M Roberts
ATTORNEY.

3,406,431
RELEASABLE FASTENER FOR CAMERA COVER
Lee B. Armstrong, Newport Beach, and Marvin A. Reid, Placentia, Calif., assignors to Coleman Engineering Company, Inc., Santa Ana, Calif., a corporation of California
Filed May 25, 1967, Ser. No. 641,376
10 Claims. (Cl. 24—73)

ABSTRACT OF THE DISCLOSURE

A releasable fastener comprises a tubular body with a manually rotatable spindle therein, the tubular body extending from a first member into releasable engagement with an inwardly facing shoulder of an opening in a second member for the purpose of interconnecting the two members. The leading end of the tubular body is longitudinally split for radial expansion and is expanded by 90° of rotation of a noncircular leading end portion of the spindle within a corresponding noncircular end portion of the tubular member.

Background of the invention

While the invention may be used for releasably interconnecting two members for various purposes in various fields, it has special utility for releasably securing a removable cover or housing wall of a camera or the like. Such a fastener should not only be reliable and positive in its action but also should be structurally simple and easy to manipulate. Preferably, it should also operate in a relatively silent manner.

The object of the invention is to provide a fastener assembly of the described character.

Summary of the inventiion

In the initial practice of the invention a cover or removable wall of a camera housing normally closes the housing in a light-proof manner and is releasably secured by a fastener that extends into an opening in fixed structure inside the camera, which opening is formed with a rearwardly facing shoulder for engagement by the fastener. The opening may be in a relatively thin plate or web, the inner rim of which provides the inwardly facing shoulder or the opening may be a bore in a relatively thick structure with an inner portion of the bore enlarged to form the inwardly facing shoulder.

The fastener assembly comprises a tubular body formed with a locking enlargement on its leading end, a spindle journaled in the tubular body and a handle or knob on the spindle on the outer side of the cover for manually rotating the spindle 90° between a locking position and a release position, the locking enlargement of the tubular body being expanded at the locking position of the spindle and being contracted at the release position of the spindle.

To cause the required expansion and contraction of the locking enlargement on the leading end of the tubular body, the locking enlargement member is split longitudinally for expansion and the interior of the leading end is of a suitable noncircular cross-sectional configuration. The corresponding leading end portion of the spindle is of a noncircular cross-sectional configuration that conforms with the inner noncircular cross-sectional configuration of the locking enlargement at the contracted state of the locking enlargement. Rotation of the spindle out of agreement with the noncircular configuration of the locking enlargement causes the required radial expansion of the locking enlargement.

In the presently preferred embodiment of the invention the noncircular cross-sectional configuration of both the spindle end and the locking enlargement is oblong with a major axis and a minor axis, the two axes being perpendicular to each other. At the contracted state of the locking enlargement, the major axis of the interior cross-sectional configuration of the spindle coincides with the major axis of the inner cross section of the locking enlargement. Rotating the spindle 90° to position its major axis perpendicularly of the major axis of the inner configuration of the locking enlargement expands the locking enlargement to cause a rearwardly facing shoulder of the locking enlargement to engage the previously mentioned inwardly facing shoulder of the opening in the fixed structure of the camera housing.

A feature of the preferred embodiment of the invention is that the tubular body of the fastener is an inexpensive molded body of a suitable plastic material such as nylon. The nylon material facilitates insertion of the locking enlargement into the cooperative opening in the fixed structure of the camera housing and the use of nylon avoids metal-to-metal contact to result in a relatively silent locking action with minimum accumulative wear.

Another feature of the preferred embodiment is the simplicity of the structure of the fastener and especially the simplicity of the assembly procedure. The spindle extends through a circular aperture in the camera cover and is retained against relative axial movement by the outer knob or handle abutting the outer side of the cover and by a snap ring on the spindle abutting the inner side of the cover. The tubular body is preferably formed with a radial base flange to permit the tubular body to be fixedly mounted on the inner side of the cover. Rotation of the spindle is limited to approximately 90° by a radial pin in the spindle which cooperates with two circumferentially spaced confronting shoulders of the tubular body.

The features and advantages of the invention may be understood from the following detailed description together with the accompanying drawing.

Brief description of the drawing

In the drawing, which is to be regarded as merely illustrative:

FIG. 1 is a fragmentary cross-sectional view showing the cover mounted on the camera housing with the spindle of the fastener rotated to its release position;

FIG. 2 is a similar view with the spindle rotated to its locking position;

FIG. 3 is an exploded perspective view of the parts of the fastener with the handle omitted;

FIG. 4 is an end elevation of the fastener in its release state as viewed along the line 4—4 of FIG. 1;

FIG. 5 is a similar end elevation of the fastener in its locking state as viewed along the line 5—5 of FIG. 2; and FIG. 6 is a view partly in section and partly in side elevation showing how the fastener in its locking position may extend into a bore into engagement with an inwardly facing shoulder that is formed by an enlargement of the bore.

Description of the preferred embodiment

In FIGS. 1 and 2, a camera housing has side walls 10 and the open side of the housing is normally closed by a cover 12 that mates with the outer edges of the side walls in a light-proof manner, the outer edges of the side walls being formed with a continuous rib 14 that fits into a corresponding continuous groove 15 in the cover. To provide for releasably anchoring the cover 12, the interior of the camera housing has a fixed web 16 that is spaced inwardly from the cover in parallel relationship thereto, the web having a circular opening the inner rim of which forms an inwardly facing shoulder 18. The cover 12 is provided with a fastener assembly that removably extends through the circular opening of the web 16 for releasable engagement with the inwardly facing shoulder 18.

The principal parts of the fastener assembly include a tubular body 22 which is preferably made of nylon, a rotary spindle 24 that is journaled in the tubular body and extends through a circular aperture 25 in the cover 12, and a knob or handle 26 that is fixedly mounted on the outer end of the spindle in abutment with the inwardly facing cover.

The tubular member 22 is formed with a radial base flange 28 having circumferentially spaced holes 30 (FIG. 3) to receive suitable fastening elements, such as screws 32 for anchoring the tubular member to the inner surface of the cover 12. The leading end of the tubular body 22 is formed with a locking enlargement 34 which is preferably tapered in both directions, the tubular body being thus formed with a beveled nose (FIG. 3) and a rearwardly facing tapered shoulder 36 that is shaped and dimensioned for releasable engagement with the inwardly facing shoulder 18 in the circular opening of the web 16.

To permit resilient radial expansion of the locking enlargement 34 the tubular body is suitably split longitudinally in the region of the locking enlargement. For this purpose the tubular body 22 may be formed with two diametrically opposite longitudinal slots 38 which extend to its leading end. Along the major portion of the length of the tubular body 22 the interior cross-sectional configuration is circular to journal the major portion of the spindle 24 and with the tubular body made of nylon the spindle rotates freely with exceedingly little frictional resistance.

In the region of the locking enlargement 34, the tubular body 22 is reduced in internal cross section and the internal cross section is changed from circular to noncircular. The corresponding end portion of the spindle 14 is also reduced in cross section and changed from circular to noncircular cross section. Various noncircular configurations may be employed within the scope of the invention. In this particular embodiment the noncircular cross-sectional configuration is oblong with a major axis and with a minor axis perpendicular thereto.

As shown in FIG. 4 the major axis of the oblong internal configuration of the locking enlargement 34 and the major axis of the oblong cross-sectional configuration of the leading end of the spindle 24 coincide and both lie in the diametrical plane of the two slots 38 when the fastener is in its release state. As shown in FIG. 5, rotation of the leading end of the spindle to place the major axis of the cross section of the leading end of the spindle perpendicular to the major axis of the internal configuration of the locking enlargement 34 causes expansion of the locking enlargement in opposite radial directions thereby to cause the rearwardly tapered shoulder 36 of the locking enlargement to make positive engagement with the inwardly facing shoulder 18 of the circular opening in the web 16 as may be seen in FIG. 2.

Preferably suitable provision is made to limit the relative rotation of the spindle 24 to a range of approximately 90°. For this purpose the noncircular leading end of the spindle 24 may be provided with a radial pin 40 that extends into a notch 42 on the leading end of the tubular body, which notch is best shown in FIG. 3. The notch 42 provides two confronting radial stop shoulders 44 that are circumferentially spaced by an angle of approximately 90° It is to be noted that the notch 42 is spaced away from the two diametrical slots 38.

For the purpose of preventing axial movement of the spindle 24 relative to the cover 12 and the tubular body 22, a snap ring 45 (FIG. 3) seats in a circumferential groove 46 of the spindle in abutment against the inner face of the cover 12, the base end of the tubular body 22 being recessed to clear the snap ring. Thus the snap ring 45 co-operates with the knob 26 to prevent axial movement of the spindle in either direction relative to the cover.

The manner in which the removable fastener functions for its purpose may be readily understood from the foregoing description. The cover 12 may be provided with suitable index marks (not shown) to indicate whether the knob 26 is in the release position or in the locking position. With the knob 26 in the release position it is a simple matter to place the cover 12 in its normal position on the camera housing with the leading end of the fastener assembly extending through the fixed web 16 as shown in FIG. 1. The knob 26 may then be turned to its locking position with corresponding rotation of the spindle 24 from the release position shown in FIG. 4 to the locking position shown in FIG. 5, at which locking position the rearward tapered shoulder 36 of the locking enlargement 34 makes positive engagement with the inwardly facing shoulder 18 of the fixed web 16. Return of the knob 26 to its release position permits ready removal of the cover 12 from the camera housing.

FIG. 6 indicates how the described releasable fastener assembly may cooperate with a relatively thick fixed structure 48 instead of the relatively thin web 16. The fixed structure 48 is formed with a bore 55 and the inner end of the bore is enlarged as shown to form an inwardly facing shoulder 52 for positive engagement by the locking enlargement 34 of the fastener.

We claim:
1. A fastener to extend from a first member into an opening in a second member for releasably engaging an inwardly facing shoulder of the opening to interconnect the two members, comprising:
   a tubular body anchored to the first member and shaped and dimensioned with a leading end for insertion into said opening beyond the inwardly facing shoulder,
   said leading end having a rearwardly facing shoulder to cooperate with said inwardly facing shoulder,
   said leading end of the tubular body being radially expandible from a contracted cross-sectional configuration to clear said inwardly facing shoulder to an expanded cross-sectional configuration for engagement of the rearwardly facing shoulder of the tubular body with the inwardly facing shoulder of the opening,
   said leading end of the tubular body being of noncircular inner cross-sectional configuration; and
   a spindle extending through said tubular body with the leading end of the spindle enclosed by the leading end of the tubular body,
   the leading end of the spindle being of noncircular configuration and the spindle being manually rotatable relative to the tubular body between a first release position and a second locking position,
   the noncircular configuration of the leading end of the spindle being shaped and dimensioned to conform with the noncircular inner configuration of the leading end of the tubular body at the release position of the spindle to permit contraction of the leading end of the tubular body to said contracted cross-sectional dimension,
   the noncircular leading end of the spindle being in nonconforming relation with the noncircular inner configuration of the leading end of the tubular body at the locking position of the spindle to maintain the leading end of the tubular body at said expanded cross-sectional dimension,
   whereby with the spindle at its release position, the tubular body may be inserted into said opening and then the spindle may be manually operated to expand the leading end of the tubular body into engagement with said inwardly facing shoulder of the opening.
2. A fastener as set forth in claim 1 which includes cooperative means on the tubular body and the spindle respectively to limit the relative rotation of the spindle to said two positions of the spindle.

3. A fastener as set forth in claim 2 in which said cooperative means comprises a peripheral projection on the spindle and two circumferentially spaced stop shoulders on the tubular body.

4. A fastener as set forth in claim 1 in which said spindle extends through the first member and handle means is mounted on the spindle on the outer side of the first member for manual rotation of the spindle.

5. A fastener as set forth in claim 4 which includes a snap ring engaging the spindle in abutment against the inner side of the first member to cooperate with the handle means to rotatably secure the spindle to the first member.

6. A fastener set forth in claim 1 in which the leading end of the tubular body is split longitudinally for radial expansion and contraction and the leading end of the tubular body is formed with an enlargement that provides said rearwardly facing shoulder of the tubular body.

7. A fastener set forth in claim 6 in which the leading end of the tubular body has an end notch forming two circumferentially spaced stop shoulders;
and in which the spindle has a peripheral projection to cooperate with the two stop shoulders to limit rotation of the spindle relative to the tubular body.

8. A fastener as set forth in claim 1 in which the tubular body has an axial bore that is contracted to the noncircular inner cross-sectional configuration of the tubular body at the leading end thereof.

9. A fastener as set forth in claim 1 in which the noncircular inner cross-sectional configuration of the tubular member at its leading end is oblong and the corresponding end portion of the spindle is similarly oblong in cross-sectional configuration.

10. A fastener as set forth in claim 1 in which the tubular body is made of a plastic having a low coefficient of friction with respect to metal.

References Cited

UNITED STATES PATENTS

| | | | |
|---|---|---|---|
| 2,788,047 | 4/1957 | Rapata | 85—80 |
| 3,145,750 | 8/1964 | Wootton | 85—83 X |
| 3,319,510 | 5/1967 | Rapata | 24—73 X |

FOREIGN PATENTS 675,809  12/1963  Canada.

DONALD A. GRIFFIN, *Primary Examiner.*